United States Patent
Nagahiro et al.

(10) Patent No.: US 9,385,567 B2
(45) Date of Patent: Jul. 5, 2016

(54) ROTATING ELECTRIC MACHINE

(71) Applicant: HONDA MOTOR CO., LTD., Tokyo (JP)

(72) Inventors: Kentaro Nagahiro, Wako (JP); Jiro Kuroki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 343 days.

(21) Appl. No.: 14/013,036

(22) Filed: Aug. 29, 2013

(65) Prior Publication Data

US 2014/0062252 A1 Mar. 6, 2014

(30) Foreign Application Priority Data

Aug. 29, 2012 (JP) ................................. 2012-188176

(51) Int. Cl.
*H02K 1/28* (2006.01)
*H02K 1/27* (2006.01)

(52) U.S. Cl.
CPC ................ *H02K 1/28* (2013.01); *H02K 1/2766* (2013.01); *H02K 2201/09* (2013.01)

(58) Field of Classification Search
CPC ............................... H02K 1/28; H02K 1/2766
See application file for complete search history.

(56) References Cited

U.S. PATENT DOCUMENTS 6,147,428 A * 11/2000 Takezawa ............ H02K 1/2766
310/156.57

FOREIGN PATENT DOCUMENTS

| JP | 2000-245087 | 9/2000 |
| JP | 2004-327184 | 11/2004 |
| JP | 2005-094959 | 4/2005 |
| JP | 4341577 B2 | 11/2006 |
| JP | 2009-225584 | 10/2009 |
| JP | 2010-178471 | 8/2010 |

OTHER PUBLICATIONS

Japanese Office Action for corresponding JP Application No. 2012-188176, Jun. 4, 2014.

* cited by examiner

*Primary Examiner* — Dang Le
(74) *Attorney, Agent, or Firm* — Mori & Ward, LLP

(57) ABSTRACT

A rotating electric machine includes a stator and a rotor. The rotor includes a plurality of permanent magnets and a rotor core. The plurality of permanent magnets are to form magnetic poles. The rotor core includes stacked steel sheets, magnet holes, a plurality of cutouts, and fixing elements. The magnet holes are provided in the stacked steel sheets. The plurality of permanent magnets are provided in the magnet holes. The plurality of cutouts are provided between the plurality of permanent magnets located adjacent in a circumferential direction of the rotor core to form different magnetic poles. The fixing elements are to fix the steel sheets to each other. The fixing elements are provided at positions on an outer peripheral side of inner peripheral end portions of the cutouts and between the cutouts and the magnet holes.

8 Claims, 4 Drawing Sheets

ROTATING ELECTRIC MACHINE

CROSS-REFERENCE TO RELATED APPLICATIONS

The present application claims priority under 35 U.S.C. §119 to Japanese Patent Application No. 2012-188176, filed Aug. 29, 2012, entitled "Rotating Electric Machine." The contents of this application are incorporated herein by reference in their entirety.

BACKGROUND OF THE INVENTION

1. Field of the Invention

The present disclosure relates to a rotating electric machine.

2. Discussion of the Background

There has been known a rotating electric machine including an annular stator and a rotor rotatably inserted in the center of the stator. The rotor is rotated by a rotating magnetic field produced by a plurality of coils wound in slots of the stator. In the rotor that constitutes such a rotating electric machine, for example, a plurality of steel sheets are stacked in a thickness direction and are caulked by caulking pins, and a plurality of pairs of magnets are arranged in a circumferential direction to form magnetic poles (see, for example, Japanese Unexamined Patent Application Publication No. 2005-94959).

SUMMARY OF THE INVENTION

According to one aspect of the present invention, a rotating electric machine includes a stator and a rotor. The stator has a coil. The rotor is rotatably provided in the stator and includes a plurality of permanent magnets and a rotor core. The plurality of permanent magnets are to form magnetic poles. The rotor core includes stacked steel sheets, magnet holes, a plurality of cutouts, and fixing elements. The magnet holes are provided in the stacked steel sheets. The plurality of permanent magnets are provided in the magnet holes. The plurality of cutouts are provided between the plurality of permanent magnets located adjacent in a circumferential direction of the rotor core to form different magnetic poles. The fixing elements are to fix the steel sheets to each other. The fixing elements are provided at positions on an outer peripheral side of inner peripheral end portions of the cutouts and between the cutouts and the magnet holes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
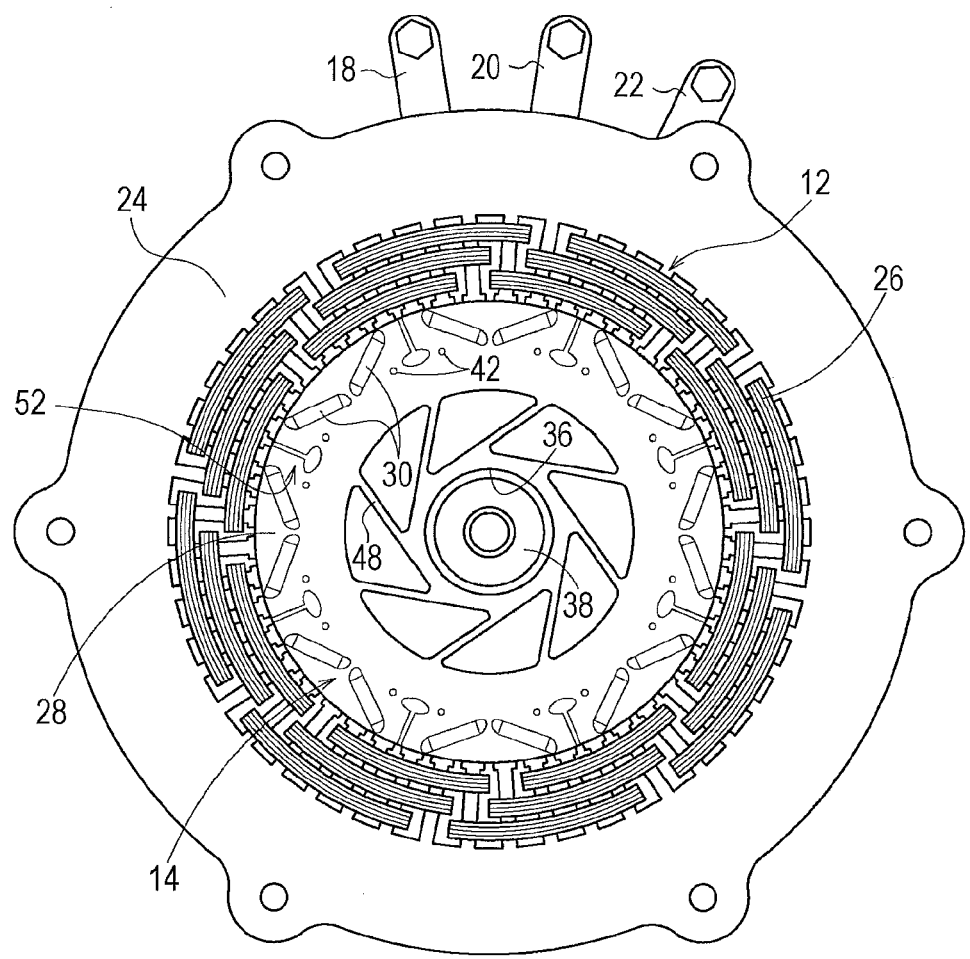
FIG. 1 is an overall front view of a rotating electric machine according to an embodiment of the present disclosure.

The embodiments will now be described with reference to the accompanying drawings, wherein like reference numerals designate corresponding or identical elements throughout the various drawings.

In FIG. 1, reference numeral 10 denotes a rotating electric machine according to the embodiment of the present disclosure.

The rotating electric machine 10 is a three-phase alternating-current brushless motor as an example, and includes an annular stator 12 and a rotor 14 inserted in the center portion of the stator 12, as illustrated in FIG. 1. In the rotating electric machine 10, the rotor 14 is rotated by power supplied from an unillustrated power supply via a U-phase terminal 18, a V-phase terminal 20, and a W-phase terminal 22.

For example, the stator 12 includes a stator core 24 formed by a plurality of steel sheets stacked in an axial direction. The stator core 24 is held in a motor case (not illustrated) by fastening bolts in holes provided in an outer peripheral portion thereof. Coils 26 are wound in a plurality of slots (not illustrated) provided in the stator core 24, and end portions of the coils 26 are connected to the U-phase terminal 18, the V-phase terminal 20, and the W-phase terminal 22.

Figure 2:
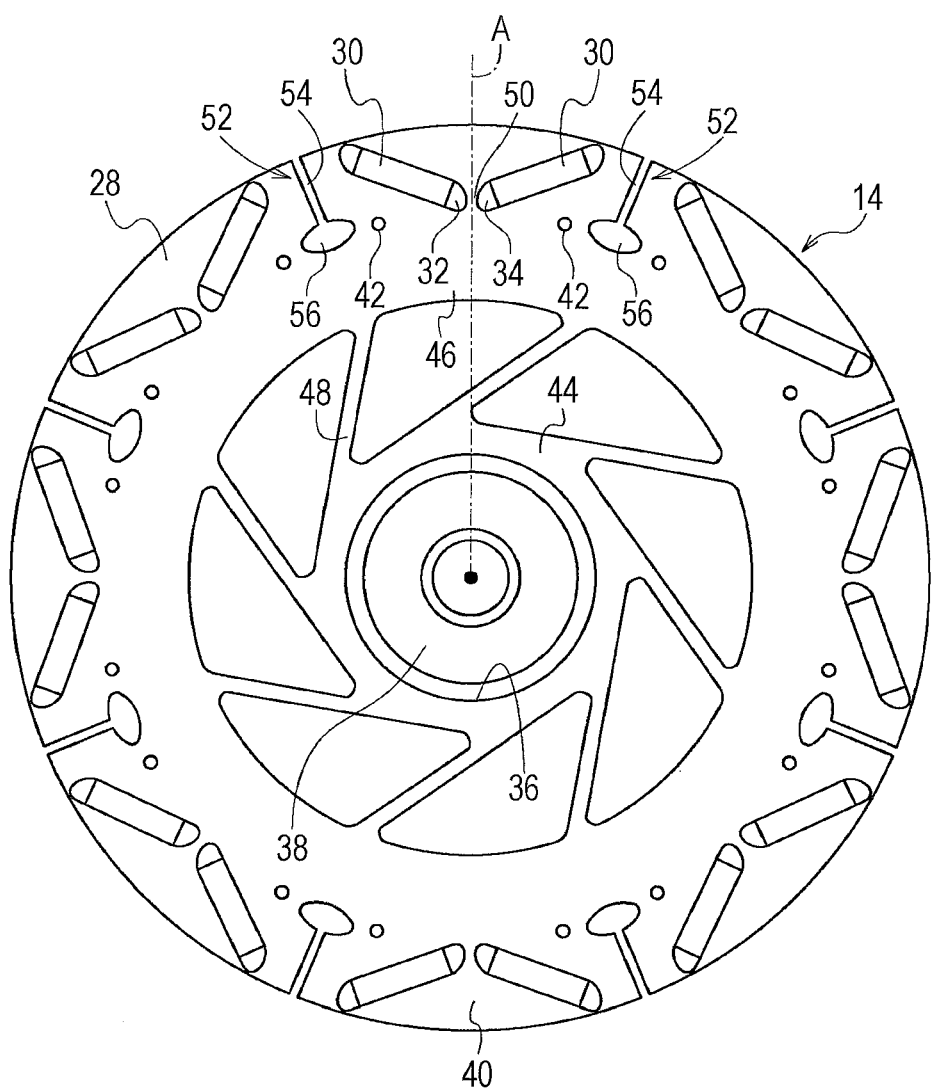
FIG. 2 is a front view of a rotor in the rotating electric machine of FIG. 1.

As illustrated in FIGS. 1 and 2, for example, the rotor 14 includes a disc-shaped rotor body (rotor core) 28, and a plurality of permanent magnets 30 provided in the rotor body 28. The rotor body 28 includes center ribs 50 spaced in a circumferential direction, and a plurality of pairs of first and second attachment holes (magnet holes) 32 and 34 that extend toward an outer peripheral surface of the rotor body 28 to form a substantially V shape. A shaft 38 is press-fitted in a through hole 36 provided in a center portion of the rotor body 28, whereby the shaft 38 and the rotor body 28 are fixed integrally.

For example, the rotor body 28 is formed by stacking a plurality of electromagnetic steel sheets (steel sheets) 40 in an axial direction (thickness direction). In a state in which a plurality of pairs of caulking parts 40 (described below) provided in the electromagnetic steel sheets 40 are engaged with one another, the electromagnetic steel sheets 40 are fixed while being aligned with one another in the axial direction and the radial direction. The center portion of the rotor body 28 includes a first annular portion 44 having the through hole 36 in which the shaft 38 is inserted, a second annular portion 46 provided on an outer peripheral side of the first annular portion 44 and having a plurality of first and second attachment holes 32 and 34 in which the permanent magnets 30 are attached, and a plurality of connecting portions 48 provided between the first and second annular portions 44 and 46 to connect these portions. The connecting portions 48 are inclined at a predetermined angle to the radial direction of the rotor body 28.

The first annular portion 44 is shaped like a ring having a substantially constant diameter. The shaft 38 is press-fitted in the through hole 36 at the center of the first annular portion 44, and this allows corotation of the rotor body 28 and the shaft 38 that constitute the rotor 14.

The second annular portion 46 is shaped like a ring having a diameter that is substantially constant and is larger than the diameter of the first annular portion 44. Near an outer peripheral surface of the second annular portion 46, a plurality of (for example, twelve) pairs of first and second attachment holes 32 and 34 are equally spaced in the circumferential direction of the second annular portion 46. The permanent magnets 30 are attached in the first and second attachment holes 32 and 34. One pair of first and second attachment holes 32 and 34 functions as one magnetic pole.

The first attachment hole 32 and the second attachment hole 34 are inclined at a predetermined angle such that adjacent end portions (inner peripheral end portions) thereof are located on an inner peripheral side and the other remote end portions (outer peripheral end portions) are located on an outer peripheral side.

The center ribs 50 extending straight in the radial direction are provided between the first attachment holes 32 and the second attachment holes 34, and the first attachment holes 32 and the second attachment holes 34 are arranged symmetrically with respect to the center ribs 50. In other words, each center rib 50 is located on a virtual line A (see FIG. 2) passing between the inner peripheral end portions of the corresponding first and second attachment holes 32 and 34 and extending in the radial direction to the center of the rotor body 28.

The second annular portion 46 has slits (cutouts) 52 provided between the magnetic poles that are adjacent to each other in the circumferential direction. Each of the slits 52 includes a linear portion 54 extending straight from an outer peripheral rim of the second annular portion 46 toward the inner peripheral side, and an oval portion 56 provided at an inner peripheral end portion of the linear portion 54. The linear portion 54 and the oval portion 56 are cut out to communicate with each other. The oval portion 56 extends long in the circumferential direction of the second annular portion 46, and is substantially symmetrical with respect to the linear portion 54. Since the slits 52 are provided between the magnetic poles, the number of slits 52 is equal to the number of magnetic poles. By forming the slits 52 in the second annular portion 46, stress produced in the second annular portion 46 is reduced when the rotor 14 rotates.

Figure 3:
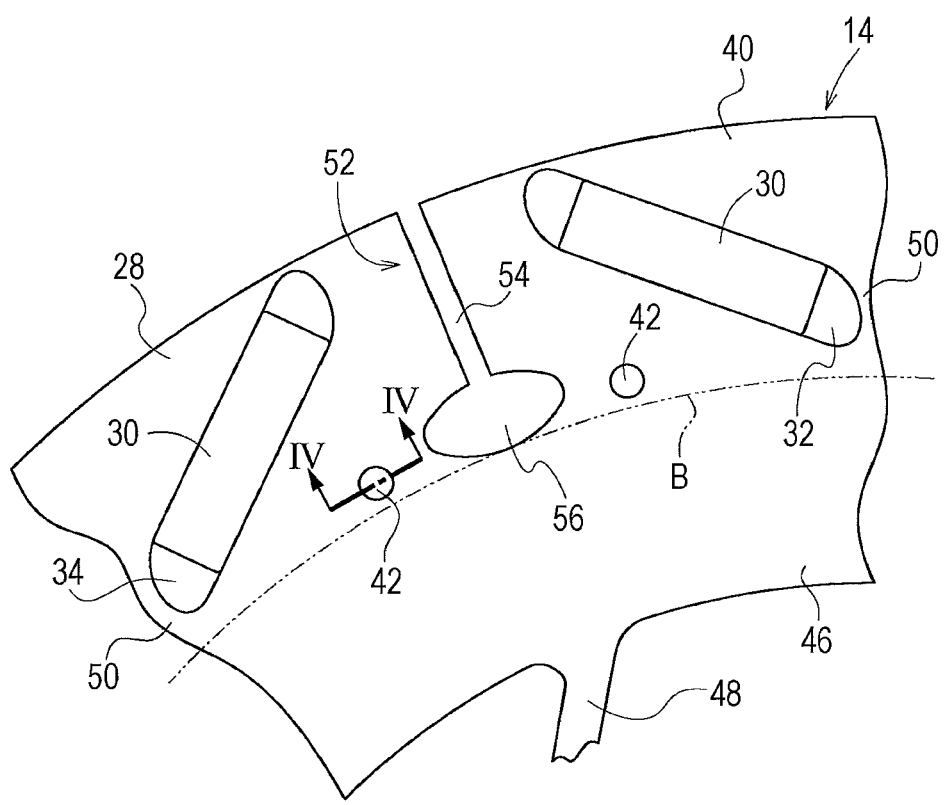
FIG. 3 is an enlarged front view of an outer rim portion and its surroundings in the rotor of FIG. 2.
Figure 4:
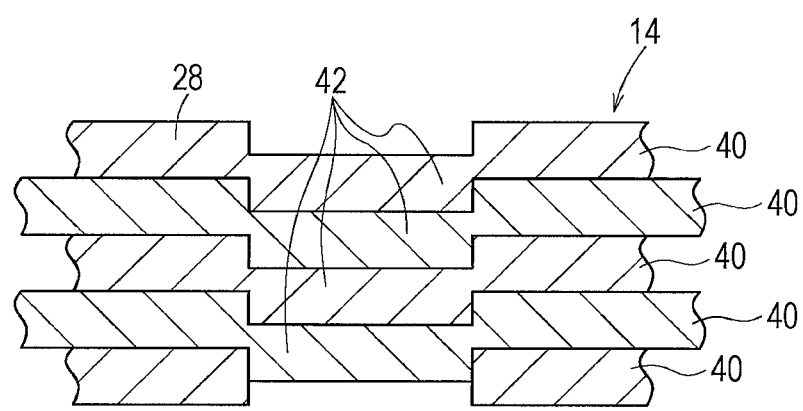
FIG. 4 is a cross-sectional view taken along line IV-IV of FIG. 3.

Further, as illustrated in FIGS. 2 and 3, the second annular portion 46 includes caulking parts 42 provided at positions between the oval portions 56 of the slits 52 and the magnetic poles (permanent magnets 30) and on an outer peripheral side of a virtual circle B passing through inner peripheral end portions of the oval portions 56 (see FIG. 3). For example, the caulking parts 42 have a circular cross section, and are shaped like recesses by being depressed by a predetermined depth in the axial direction when the electromagnetic steel sheets 40 are press-formed. The caulking parts 42 are arranged in pairs, and each pair of caulking parts 42 are located at positions that are substantially symmetrical with respect to the virtual line A passing between the inner peripheral end portions of the corresponding first and second attachment holes 32 and 34 and extending in the radial direction toward the center of the rotor body 28.

A plurality of electromagnetic steel sheets 40 are stacked in the axial direction (thickness direction) and are connected while being positioned in the circumferential direction with the caulking parts 42 being inserted in the caulking parts 42 of the adjacent electromagnetic steel sheets 40.

That is, the caulking parts 42 are located at the positions on the outer peripheral side of the virtual circle B and between the slits 52 and the magnetic poles, where stress produced during rotation of the rotor 14 is low and the change in magnetic flux density is small. In other words, the caulking parts 42 are not provided in areas on the inner peripheral side of the second annular portion 46 (inner peripheral side of the virtual circle B) where high stress is produced during rotation of the rotor 14 and on the outer peripheral side of the magnetic poles where the magnetic flux density is high.

By forming the caulking parts 42 near the widthwise center of the second annular portion 46 in the radial direction, the rotor body 28 including the second annular portion 46 can be bundled and fixed suitably.

The rotating electric machine 10 according to the embodiment of the present disclosure basically has the above-described configuration. Next, the operation and operational effect of the rotating electric machine 10 will be described.

When electric power is supplied from the unillustrated power supply to the U-phase terminal 18, the V-phase terminal 20, and the W-phase terminal 22, the coils 26 are energized and excited to produce a rotating magnetic field. The rotating magnetic field rotates the rotor 14 having the permanent magnets 30 serving as magnetic poles. At this time, since the caulking parts 42 are provided at the positions on the outer peripheral side of the inner peripheral end portions of the oval portions 56 of the slits 52 and between the slits 52 and the permanent magnets 30 (magnetic poles), concentration of stress on the caulking parts 42 is relaxed.

As described above, in the rotor 14 of the rotating electric machine 10 of the embodiment, stress due to centrifugal force is reduced by forming the slits 52 between the permanent magnets 30 that form different magnetic poles. Further, the caulking parts 42 are provided at the positions between the slits 52 and the magnetic poles and on the outer peripheral sides of the inner peripheral end portions of the oval portions 56 of the slits 52, where little stress is produced and the change in magnetic flux density is small, whereby the electromagnetic steel sheets 40 that form the rotor 14 are aligned and connected. Since this can reduce the stress on the caulking parts 42, it is unnecessary to set an excessive strength of the rotor 14. With this, the size and weight of the rotor 14 can be reduced. Further, since the stress can be reduced in the caulking parts 42, the number of rotations of the rotor 14 can be made larger than in the rotating electric machine of the related art. This achieves high-speed rotation.

Further, since the caulking parts 42 can be formed simultaneously with press forming of the electromagnetic steel sheets 40, caulking pins are unnecessary in contrast to the case in which the electromagnetic steel sheets 40 are connected in a stacked state by the caulking pins. This can reduce the number of components. Moreover, since the electromagnetic steel sheets 40 can be connected only by stacking the sheets 40 and engaging the caulking parts 42, the number of assembly steps can be reduced.

Further, since electrical continuity is established among the stacked electromagnetic steel sheets 40 at the caulking parts 42, eddy current is more likely to flow than in portions other than the caulking parts 42, because of the change in magnetic flux density (alternating current magnetic flux). However, by locating the caulking parts 42 at the positions in the rotor body 28 where the change in magnetic flux density is small, the increase in eddy current can be suppressed, and iron loss of the rotor 14 can be reduced. This allows the rotor 14 to be rotated with higher efficiency.

Still further, the caulking parts 42 are provided at the positions substantially symmetrical with respect to the virtual line A passing between the inner peripheral end portions of the first and second attachment holes 32 and 34 and extending in the radial direction to the center of the rotor body 28. Hence, for example, the electromagnetic steel sheets 40 can be equally bundled and fixed relative to the permanent magnets 30 and the like. Moreover, since stress produced during rotation of the rotor is equally distributed to the caulking parts 42, the stress on each caulking portion 42 can be reduced.

The rotating electric machine of the present disclosure is not limited to the above-described embodiment, and can have various configurations without departing from the scope of the present disclosure.

A rotating electric machine according to an aspect of the embodiment includes a stator having a coil, and a rotor including a rotor core formed by stacked steel sheets and a plurality of permanent magnets configured to form magnetic poles, and rotatably provided in the stator. The rotor core includes a plurality of cutouts provided between the permanent magnets located adjacent in a circumferential direction to form different magnetic poles, and fixing elements that fix the steel sheets to each other, the fixing elements being provided at positions on an outer peripheral side of inner peripheral end portions of the cutouts and between the cutouts and magnet holes in which the permanent magnets are inserted.

In this case, in the rotor of the rotating electric machine, the rotor core formed by stacked steel sheets includes a plurality of cutouts provided adjacent in the circumferential direction and between the permanent magnets that form different magnetic poles, and the fixing elements configured to fix the steel sheets. The fixing elements are provided on the outer peripheral side of the inner peripheral end portions of the cutouts and between the cutouts and the magnet holes in which the permanent magnets are inserted.

Therefore, stress resulting from centrifugal force can be reduced by forming the cutouts in the rotor core of the rotor. Further, stress on the fixing elements can be reduced by forming the fixing elements at the positions on the outer peripheral side of the inner peripheral end portions of the cutouts and between the cutouts and the magnet holes in which the permanent magnets are inserted, where little stress is produced and the change in magnetic flux density is small. As a result, there is no need to set an excessive strength of the rotor, and the size and weight of the rotor can be reduced. Moreover, the rotor can be rotated at a higher speed than in the rotating electric machine of the related art.

By being arranged to be symmetrical with respect to a center line passing between the adjacent permanent magnets that form one magnetic pole, the fixing elements can also be located to be symmetrical with respect to the center line, similarly to the permanent magnets and the cutouts. Hence, the steel sheets can be equally bundled and fixed relative to the permanent magnets and the like. Further, since the stress produced during rotation of the rotor is equally distributed to the fixing elements, the stress on the fixing elements can be reduced.

Preferably, the fixing elements according to the embodiment are caulking parts that have a circular cross section, project in an axial direction, and are connected by engagement with the adjacent steel sheets. This allows the stress on the fixing elements to be substantially equally produced on outer peripheral surfaces of the caulking parts of circular cross section. Hence, concentration of stress can be relaxed. Since electrical continuity is established among the stacked steel sheets at the caulking parts, eddy current is more likely to flow because of the change in magnetic flux density (alternating-current magnetic flux) than in the portions other than the caulking parts. However, by placing the caulking parts at the positions where the change in magnetic flux density is small, the increase in eddy current is suppressed, and iron loss of the rotor can be reduced. Thus, the rotor can be rotated with higher efficiency.

Preferably, each of the cutouts according to the embodiment includes a linear portion extending from an outer peripheral surface of the rotor core toward an inner peripheral side, and an oval portion provided at an inner peripheral end portion of the linear portion, extending in the circumferential direction of the rotor core, and being symmetrical with respect to the linear portion. The inner peripheral end portion is located on an inner peripheral side of the oval portion. Thus, stress caused when centrifugal force is applied is reduced by forming, in the rotor core, the cutouts each including the linear portion and the oval portion. The stress on the fixing elements in the portions, where the stress is reduced, can be reduced by forming the fixing elements on the outer peripheral side of the inner peripheral side of the oval portion.

Obviously, numerous modifications and variations of the present invention are possible in light of the above teachings. It is therefore to be understood that within the scope of the appended claims, the invention may be practiced otherwise than as specifically described herein.

What is claimed is:

1. A rotating electric machine comprising:
   a stator having a coil; and
   a rotor rotatably provided in the stator and comprising:
      a plurality of permanent magnets to form magnetic poles; and
      a rotor core comprising:
         stacked steel sheets;
         magnet holes which are provided in the stacked steel sheets and in which the plurality of permanent magnets are provided;
         a plurality of cutouts provided between the plurality of permanent magnets located adjacent in a circumferential direction of the rotor core to form different magnetic poles; and
         fixing elements to fix the steel sheets to each other, the fixing elements being provided at positions on an outer peripheral side of inner peripheral end portions of the cutouts and between the cutouts and the magnet holes,
      wherein at least a portion of the fixing elements are provided at a same radial distance from an axis of the rotor core as an innermost peripheral end portion of the magnet holes.

2. The rotating electric machine according to claim 1, wherein the fixing elements are arranged symmetrically with respect to a center line passing between the plurality of permanent magnets located adjacent in the circumferential direction to form one magnetic pole.

3. The rotating electric machine according to claim 2, wherein the center line extends in a radial direction of the rotor core to a center of the rotor core.

4. The rotating electric machine according to claim 3,
   wherein the rotor core includes a center rib provided between the magnet holes in which the plurality of permanent magnets located adjacent in the circumferential direction to form one magnetic pole are provided,
   wherein the center rib is located on the center line, and
   wherein the magnet holes in which the plurality of permanent magnets located adjacent in the circumferential direction to form one magnetic pole are provided are arranged symmetrically with respect to the center rib.

5. The rotating electric machine according to claim 1, wherein the fixing elements comprise caulking parts each having a circular cross section, the caulking parts projecting in an axial direction and being connected by engagement with adjacent steel sheets.

6. The rotating electric machine according to claim 1,
   wherein each of the cutouts includes
      a linear portion extending from an outer peripheral surface of the rotor core toward an inner peripheral side, and
      an oval portion provided at an inner peripheral end portion of the linear portion and extending in the circumferential direction of the rotor core, the oval portion being symmetrical with respect to the linear portion, and
   wherein the inner peripheral end portion of the cutouts is located on an inner peripheral side of the oval portion.

7. The rotating electric machine according to claim 6, wherein at least a portion of the oval portion of the cutouts are provided at the same radial distance from the axis of the rotor core as the portion of the fixing elements and the magnet holes.

8. A rotating electric machine comprising:
a stator having a coil; and
a rotor rotatably provided in the stator and comprising:
   a plurality of permanent magnets to form magnetic poles; and
   a rotor core comprising:
      stacked steel sheets;
      magnet holes which are provided in the stacked steel sheets and in which the plurality of permanent magnets are provided;
      a plurality of cutouts provided between the plurality of permanent magnets located adjacent in a circumferential direction of the rotor core to form different magnetic poles; and
      fixing elements to fix the steel sheets to each other, the fixing elements being provided at positions on an outer peripheral side of inner peripheral end portions of the cutouts and between the cutouts and the magnet holes,
   wherein each of the cutouts includes:
      a linear portion extending from an outer peripheral surface of the rotor core toward an inner peripheral side; and
      an oval portion provided at an inner peripheral end portion of the linear portion,
   wherein the inner peripheral end portion of the cutouts is located on an inner peripheral side of the oval portion, and
   wherein at least a portion of the fixing elements is provided at a same radial distance from an axis of the rotor core as the oval portion of the cutouts.

* * * * *